(12) United States Patent
Lee et al.

(10) Patent No.: US 9,785,227 B2
(45) Date of Patent: Oct. 10, 2017

(54) PORTABLE ELECTRONIC SYSTEMS

(71) Applicant: Quanta Computer Inc., Taoyuan (TW)

(72) Inventors: Te-Chun Lee, Taoyuan (TW);
Yu-Liang Shih, Taoyuan (TW);
Jung-Wen Chang, Taoyuan (TW);
Ming-Yang Liu, Taoyuan (TW)

(73) Assignee: QUANTA COMPUTER INC.,
Guishan Dist., Taoyuan (TW)

( * ) Notice: Subject to any disclaimer, the term of this patent is extended or adjusted under 35 U.S.C. 154(b) by 23 days.

(21) Appl. No.: 15/009,069

(22) Filed: Jan. 28, 2016

(65) Prior Publication Data
US 2017/0147059 A1    May 25, 2017

(30) Foreign Application Priority Data

Nov. 23, 2015    (TW) .............................. 104138708 A

(51) Int. Cl.
| | | |
|---|---|---|
| *G06F 9/00* | (2006.01) | |
| *G06F 1/00* | (2006.01) | |
| *G06F 13/00* | (2006.01) | |
| *G06F 1/32* | (2006.01) | |
| *G06F 1/26* | (2006.01) | |
| *G06F 1/16* | (2006.01) | |
| *G06F 13/40* | (2006.01) | |

(52) U.S. Cl.
CPC ............ *G06F 1/3287* (2013.01); *G06F 1/163* (2013.01); *G06F 1/26* (2013.01); *G06F 1/3296* (2013.01); *G06F 1/1632* (2013.01); *G06F 13/4063* (2013.01); *G06F 13/4081* (2013.01)

(58) Field of Classification Search
None
See application file for complete search history.

(56) References Cited

U.S. PATENT DOCUMENTS

| | | | | |
|---|---|---|---|---|
| 5,781,511 A | * | 7/1998 | Yasukawa .......... | A61B 5/02438 368/10 |
| 6,973,301 B1 | * | 12/2005 | Contino ............ | H04M 1/72572 455/419 |
| 8,866,702 B1 | * | 10/2014 | Wong ................... | G02B 27/017 345/7 |
| 8,990,461 B2 | * | 3/2015 | Ballot .................. | G06F 13/426 710/10 |

(Continued)

FOREIGN PATENT DOCUMENTS

| | | |
|---|---|---|
| CN | 204496520 | 7/2015 |
| CN | 105044630 | 11/2015 |
| TW | 200814900 | 3/2008 |

OTHER PUBLICATIONS

Chinese language office action dated Jul. 27, 2016, issued in application No. TW 104138708.

*Primary Examiner* — Ji H Bae
(74) *Attorney, Agent, or Firm* — McClure, Qualey & Rodack, LLP

(57) ABSTRACT

A portable electronic system is provided. The portable electronic system includes a wearable device and a host. The wearable device includes a connector and a magnetic-reed switch. The connector includes a first detection point. The host detects a voltage at the first detection point and a state of the magnetic-reed switch when the host performs a detection operation. The host performs at least one of a plurality of functional operations according to a detection result of the detection operation.

8 Claims, 14 Drawing Sheets

(56) References Cited

U.S. PATENT DOCUMENTS

| | | | |
|---|---|---|---|
| 2005/0049003 A1* | 3/2005 | Lail, Jr. | H04M 1/72527 455/557 |
| 2009/0076360 A1* | 3/2009 | Brister | A61B 5/1411 600/365 |
| 2012/0316471 A1* | 12/2012 | Rahman | A61B 5/14532 600/595 |
| 2014/0031081 A1 | 1/2014 | Vossoughi et al. | |
| 2015/0201267 A1* | 7/2015 | Chang | H04R 1/1041 381/74 |
| 2015/0262458 A1* | 9/2015 | Faaborg | G08B 5/228 340/539.11 |
| 2015/0316394 A1 | 11/2015 | Kim et al. | |
| 2016/0139787 A1* | 5/2016 | Joo | G06F 3/0488 715/765 |
| 2016/0174274 A1* | 6/2016 | Ryu | G06F 1/163 370/310 |
| 2016/0192716 A1* | 7/2016 | Lee | A41D 1/002 2/422 |
| 2017/0026752 A1* | 1/2017 | Jung | H04R 5/04 |

* cited by examiner

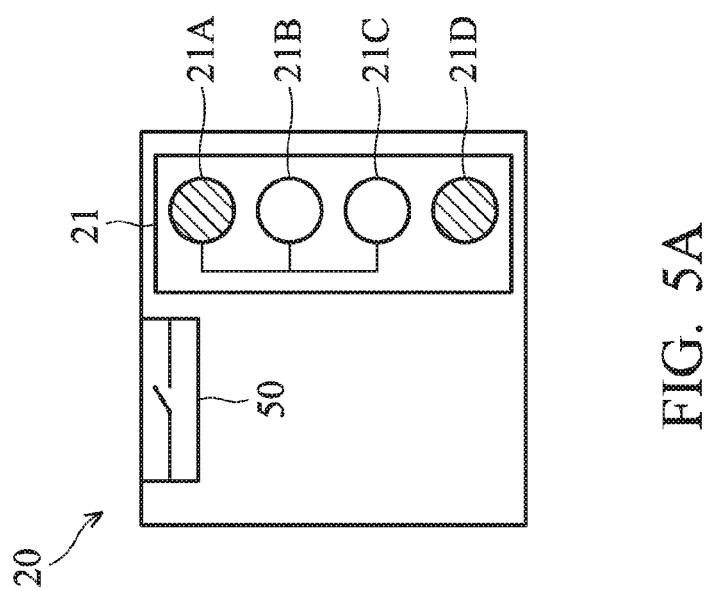

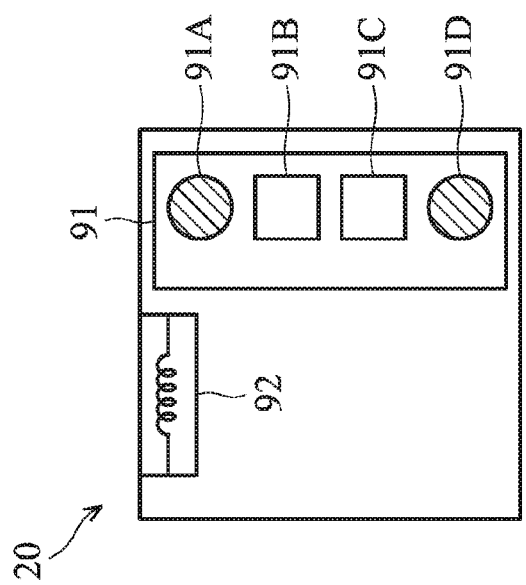

PORTABLE ELECTRONIC SYSTEMS

CROSS REFERENCE TO RELATED APPLICATIONS

This application claims priority of Taiwan Patent Application No. 104138708, filed on Nov. 23, 2015, the entirety of which is incorporated by reference herein.

BACKGROUND OF THE INVENTION

Field of the Invention

The present invention relates to an adaptive power converter, and, more specifically, the present invention relates to a wearable device which presents its own unique serial number through different types of identification elements and their states.

Description of the Related Art

With the rising popularity of wearable devices, applications using wearable devices are becoming more diverse. A body (host) can be connected with a plurality of different wearable devices. In general, whenever a host is connected with a wearable device, the user needs to manually enable the corresponding application of the wearable device which is installed on the host, reducing the user's convenience.

BRIEF SUMMARY OF THE INVENTION

The present invention provides a wearable device for a portable electronic system. The wearable device presents its own unique serial number through different types of identification elements and their states, so that the host connected with the wearable device can perform a specific functional operation corresponding to the serial number.

An exemplary embodiment of a portable electronic system is provided. The portable electronic system comprises a wearable device and a host. The wearable device comprises a connector and a magnetic-reed switch. The connector comprises a first detection point. When the host performs a detection operation, the host detects a voltage at the first detection point and a state of the magnetic-reed switch. The host performs at least one of a plurality of functional operations according to a detection result of the detection operation.

Another exemplary embodiment of a portable electronic system is provided. The portable electronic system comprises a wearable device and a host. The wearable device comprises a connector and a Hall transducer. The connector comprises a first detection point. When the host performs a detection operation, the host detects a state of the first detection point and a voltage generated by the Hall transducer. The host performs at least one of a plurality of functional operations according to a detection result of the detection operation A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 5A shows an exemplary embodiment of a wearable device with a magnetic-reed switch;

FIG. 9A show an exemplary embodiment of a wearable device; and

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
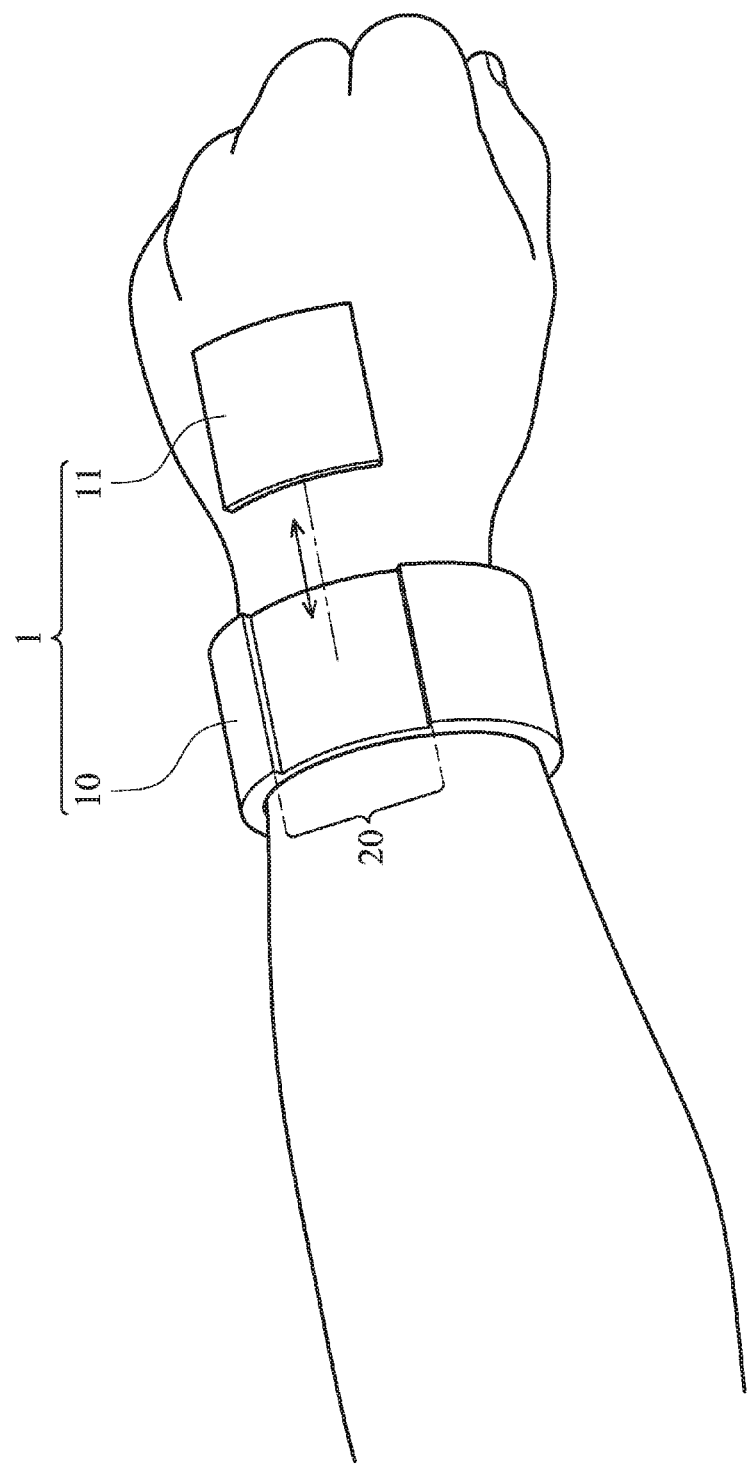
FIGS. 1A-1B show an exemplary embodiment of a portable element system.
Figure 1B:
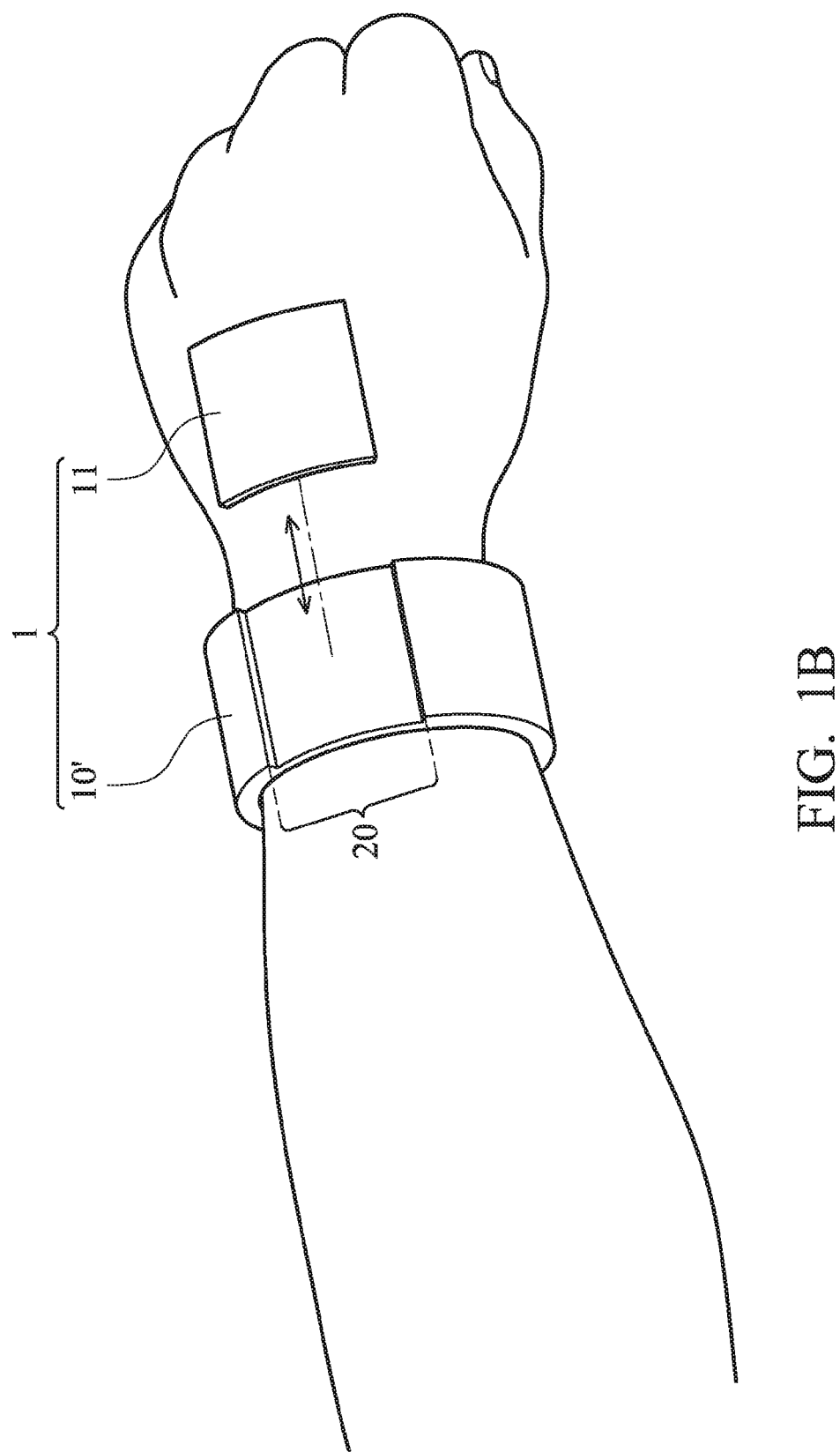

FIG. 1 shows an exemplary embodiment of a portable electronic system 1. The portable electronic system 1 comprises wearable device 10 and a host 11. In the embodiment, each of the wearable device 10 and the host 11 is an independent object. When the host 11 is placed on the wearable device 10, the host 11 is connected with a connection portion (shown in FIG. 2A) of the wearable device 10. The host 11 may depart from the wearable device 10, and another wearable device 10' is connected with the host 11 instead of the wearable device 10. At this time, the portable electronic system 1 is composed of the wearable device 10' and the host 11, as shown in FIG. 1B. In the above embodiments, the wearable device 10 is implemented by a device with a bracelet form or another device that is wearable on the body of the user.

Figure 2B:
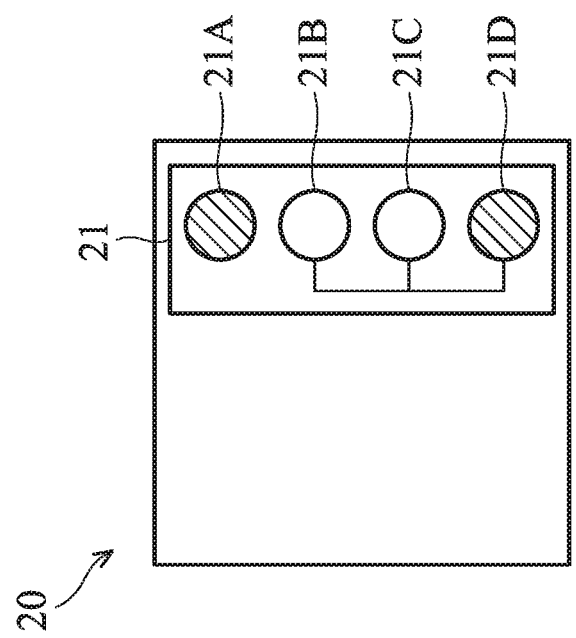
FIGS. 2A-2D show an exemplary embodiment of a wearable device.
Figure 2A:
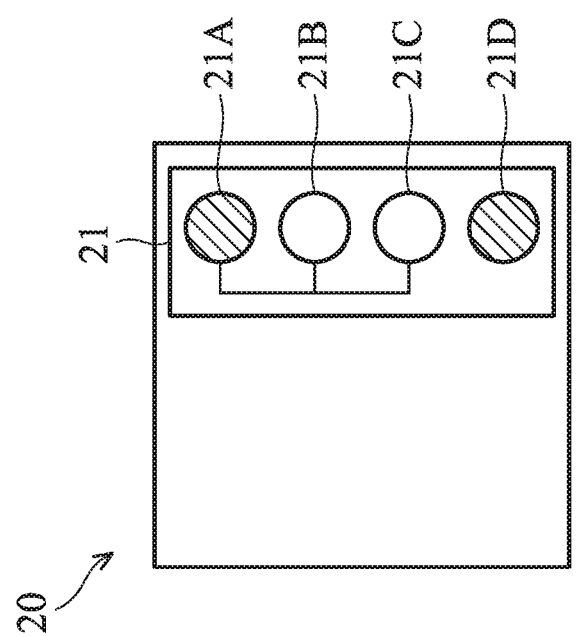
Figure 2C:
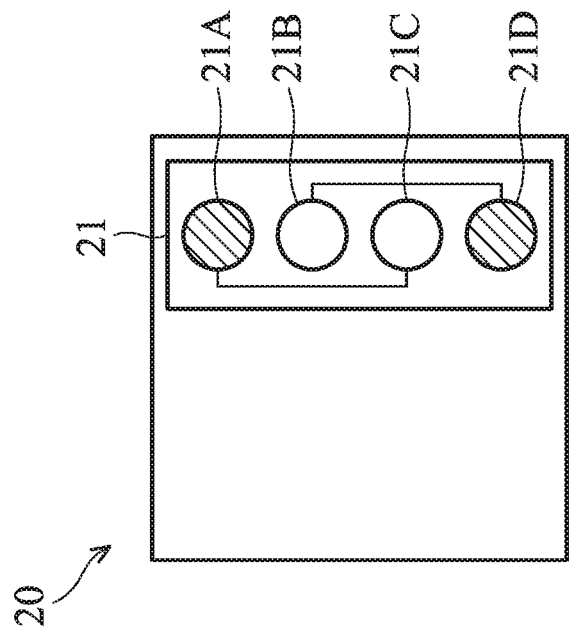
Figure 2D:
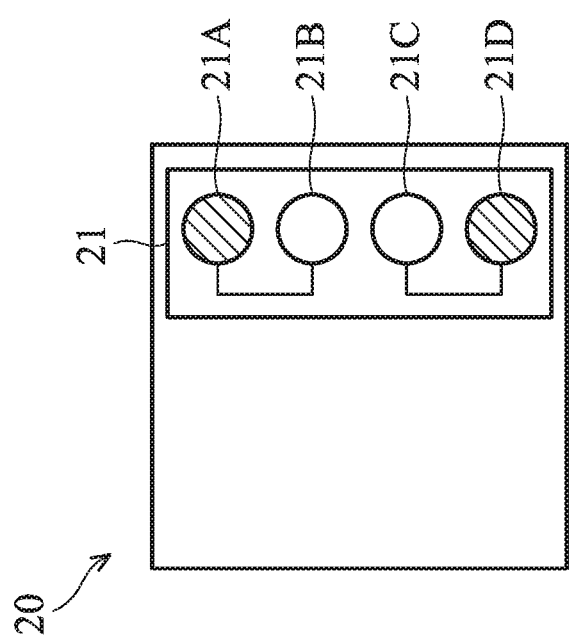

Referring to FIG. 2A, the wearable device 10 has a connection portion 20. The connection portion 20 comprises a connector 21. In the embodiment, the connector 21 is implemented by a pogo-pin connector. The connector 21 has a plurality of connection points including supply-voltage connection points 21A and 21D and a plurality of detection points. In the embodiment of FIG. 2A, two detection points 21B and 21C are given as an example. The detection point 21A may be connected with the supply-voltage connection point 21A or 21D through a conductive line, while the detection point 21B may be connected with the supply-voltage connection point 21A or 21D through another conductive line. For example, both of the detection points 21B and 21C are connected with the supply-voltage connection point 21A through the respective conductive lines (as shown in FIG. 2A), both of the detection points 21B and 21C are connected with the supply-voltage connection point 21D through the respective conductive lines (as shown in FIG. 2B), the detection point 21B is connected with the supply-voltage connection point 21A through the corresponding conductive line while the detection point 21C is connected with the supply-voltage connection point 21D through the corresponding conductive lines (as shown in FIG. 2C), or the detection point 21B is connected with the supply-voltage connection point 21D through the corresponding conductive line while the detection point 21B is connected with the supply-voltage connection point 21D through the corresponding conductive lines (as shown in FIG. 2D). When the host 11 is placed on the wearable device 10, a sensor 30 (shown in FIG. 3) of the host 11 contacts the connector 21.

Figure 3:
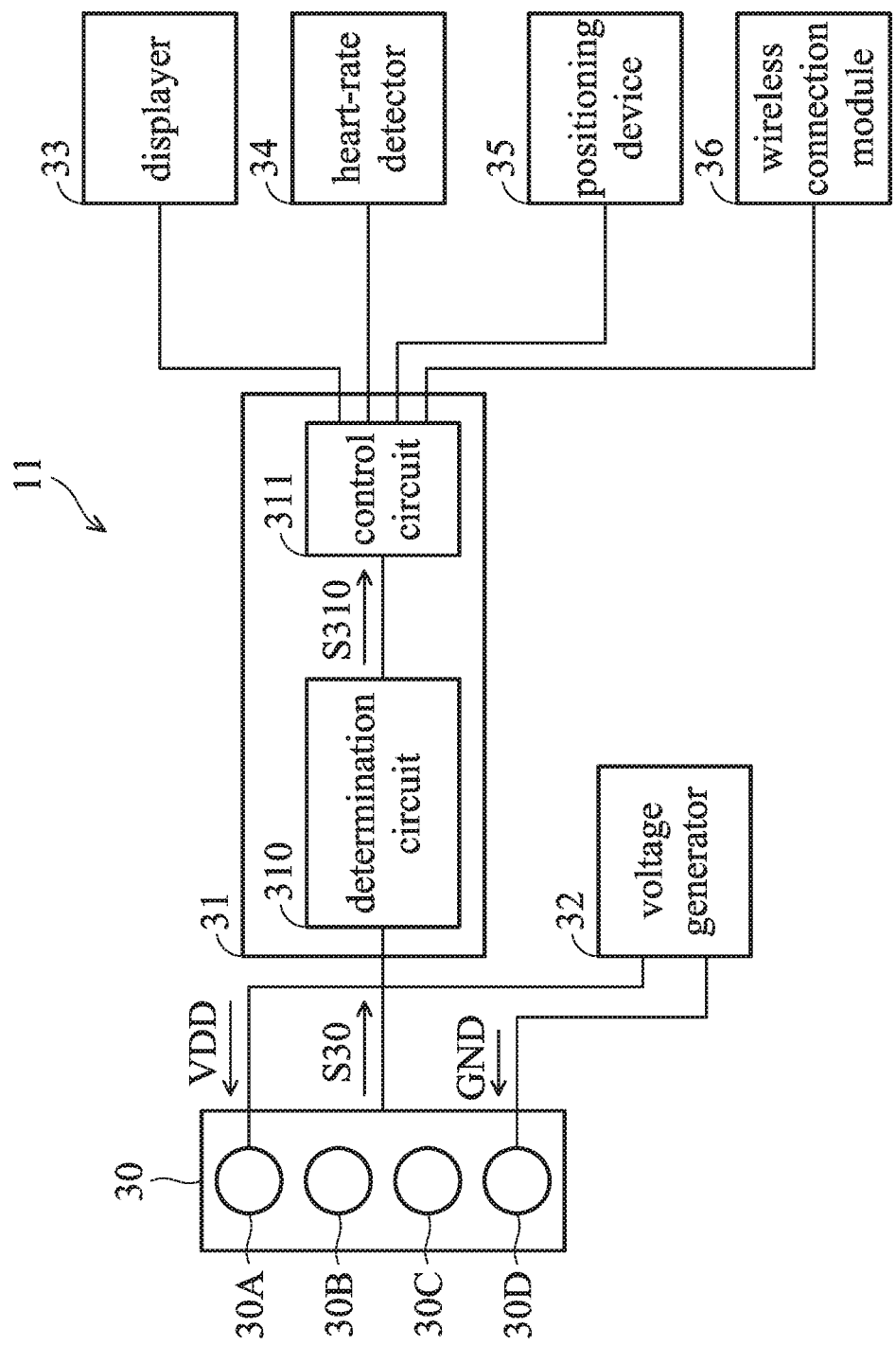
FIG. 3 shows an exemplary embodiment of a host of a wearable device.

Referring to FIG. 3, the host 11 comprises the sensor 30, a processor 31, and a voltage generator 32. The processor 31 comprises a determination circuit 310 and a control circuit 311. The sensor 30 comprises a plurality of connection points which correspond to the connection points of the connector 21 respectively. Accordingly, the number of connection points of the sensor 30 is equal to the number of connection points of the connector 21. In the embodiment, the sensor 30 comprises four connection points 31A-31D which correspond to the connection points 21A-21D of the connector 21 (that is, the two supply-voltage connection points 21A and 21D and the two detection points 21B and 21C) respectively. When the sensor 30 of the host 11 is connected with the connector 21 of the wearable device 10, the connection points 30A-30D of the sensor 30 contact the connection points 21A-21D of the connector 21 respectively. At this time, the voltage generator 32 provides an operation voltage VDD to the supply-voltage connection point 21A through the connection point 30A and further provides a reference voltage GND to the supply-voltage connection point 21D through the connection point 30D. In the embodiment, the voltage level of the operation voltage VDD is higher than the voltage level of the reference voltage GND. Moreover, when the sensor 30 of the host 11 is connected with the connector 21 of the wearable device 10, the host 11 performs a detection operation.

In the following description, it is assumed that the connection between the connection points 21A-21D of the connector 21 of the wearable device 10 is implemented by the connection structure shown in FIG. 2A. Both of the detection points 21B and 21C are connected with the supply-voltage connection point 21A through the respective conductive lines. Thus, when the host 11 performs the detection operation, the sensor 30 detects that both of the detection points 21B and 21C are at a high voltage level through the connection points 30B and 30C and generates a corresponding detection signal S30 to the determination circuit 310 of the processor 31. The determination circuit 310 identifies the serial number of the wearable device 10 according to the received detection signal S30 and generates a control signal S310 to the control circuit 311 according to the serial number. The control circuit 311 performs at least one functional operation according to the control signal S310. Referring to FIG. 3, the host 11 further comprises a displayer 33 for displaying images. For example, the control circuit 311 performs at least one functional operation related to image display or human-machine interaction. In cases where the connection between the connection points 21A-21D of the connector 21 of the wearable device 10 is implemented by any one of the connection structures shown in FIGS. 2B-2D, when the host 11 is connected with the wearable device 10, the host 11 performs the above detection operation. The related description is omitted here.

In an embodiment, the host 11 may further comprise various types of application devices, such as a heart-rate detector 34 and a positioning device 35. When the determination circuit 310 identifies the serial number of the wearable device 10, the control circuit 311 controls at least one application device according to the received control signal S310. For example, according to the received control signal S310, the control circuit 311 controls the heart-rate detector 34 to perform a functional operation related to bio-signal measurement, or controls the positioning device 35 to perform a functional operation related to positioning. In another embodiment, the host 11 may further comprise a wireless connection module 36, such as a Bluetooth module or a near field communication (NFC) module. When the determination circuit 310 identifies the serial number of the wearable device 10, the control circuit 311 activates the wireless connection module 36 according to the received control signal S310 to communicate with an external device in a wireless manner. Using wireless communication, the host 11 is capable of performing signal transmission with the external device. For example, the host 11 uploads data to the external device, or the external device installs an application program into the host 11.

The connector 21 of the wearable device 10' shown in FIG. 1B has one of the connection structures shown in FIGS. 2A-2D. When the host 11 departs from the wearable device 10 and then is connected with the wearable device 10', the host 11 also performs the above operation. As described above, different connection structures between the connection points of the connector of the wearable device represent different serial numbers. Thus, the host, which is connected with one wearable device, is capable of obtaining the serial number of the wearable device by detecting the specific states of the connection points (such as voltage stages) to perform applications corresponding to the wearable device. Accordingly, a host in which various functional operations are installed can automatically perform the corresponding functional operations according to the serial number of the wearable device.

Figure 4B:
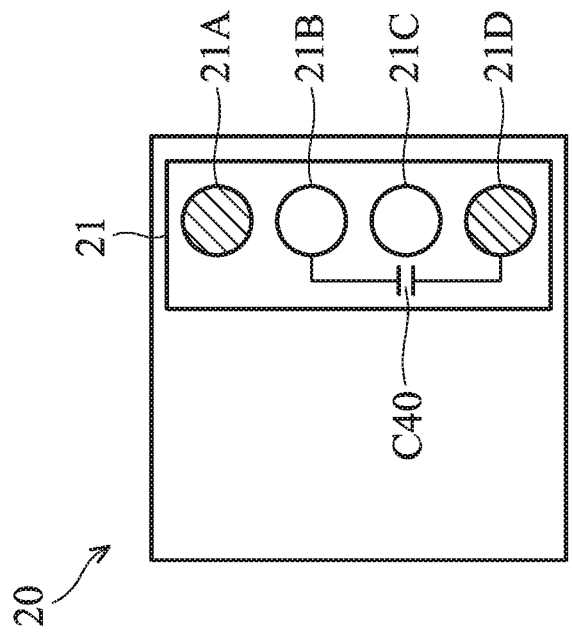
FIG. 4B shows another exemplary embodiment of a wearable device.
Figure 4A:
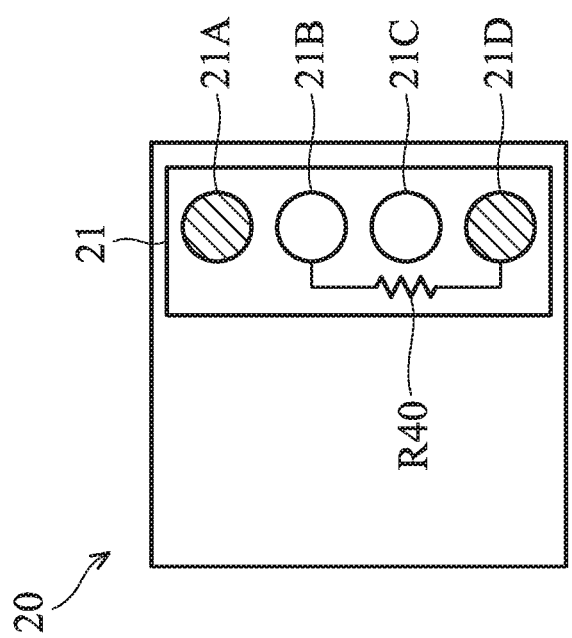
FIG. 4A shows another exemplary embodiment of a wearable device.

FIG. 4A shows another exemplary embodiment of the wearable device 10. In the embodiments of FIGS. 2A-2D, different connection structures between the connection points of the connector 21 represent different serial numbers of the wearable device. In the embodiment of FIG. 4A, the serial number of the connector 21 is represented by the resistive value of two connection points of the connector 21. Referring to FIG. 4A, the connector 21 comprises a resistor R40 which is connected between the detection point 21B and the supply-voltage connection point 21D. When the sensor 30 of the host 11 contacts the connector 21 of the wearable device 10, the host 11 performs a detection operation. During the detection operation, the voltage generator 32 provides the reference voltage GND to the supply-voltage connection point 21D through the connection point 30D, and the host 11 provides a detection circuit to the detection point 21B through the connection point 30B. According to the value of the detection current and the resistive value of the resistor R40, a corresponding voltage is generated at the detection point 21B. The sensor 30 detects the voltage state of the detection point 21B through the connection point 30B and generates the corresponding detection signal S30 to the determination circuit 310 of the processor 31. The determination circuit 310 identifies the serial number of the wearable device 10 according to the received detection signal S30 and generates the control signal S310 to the control circuit 311 according to the serial number. The control circuit 311 performs at least one functional operation according to the control signal S310. In another embodiment, the resistor R40 is replaced with a capacitor C40, as shown in FIG. 4B. During the detection operation, according to the value of the detection current and the capacitance value of the capacitor C40, a corresponding voltage is generated at the detection point 21B. The host 22 performs the above operation to identify the serial number represented by the capacitor C40 for performing the corresponding functional operation(s). In the embodiment, the detection current from the host 11 can provided by the sensor 30 or the voltage generator 32.

According to the embodiments of FIGS. 4A and 4B, as described above, resistors with different resistance values disposed on the wearable device represent different serial numbers. Thus, the host, which is connected with one wearable device, is capable of obtaining the serial number of the wearable device by detecting the specific states of the connection points (such as voltage stages) induced by the resistance value of the resistor on the wearable device to perform applications corresponding to the wearable device.

In the embodiments of FIGS. 4A and 4B, the resistor R40/capacitor C40 is connected between the detection point 21B and the supply-voltage connection point 21D. In other embodiments, the resistor R40/capacitor C40 can be connected between any point and the supply-voltage connection point 21D. For example, the resistor R40/capacitor C40 is connected between the detection point 21C and the supply-voltage connection point 21D. In this case, the host 11 provides the detection current to the detection point 21C through the connection point 30C and obtains the state of the detection point 21C through the connection point 30C to generate the corresponding detection signal S30.

Figure 5B:
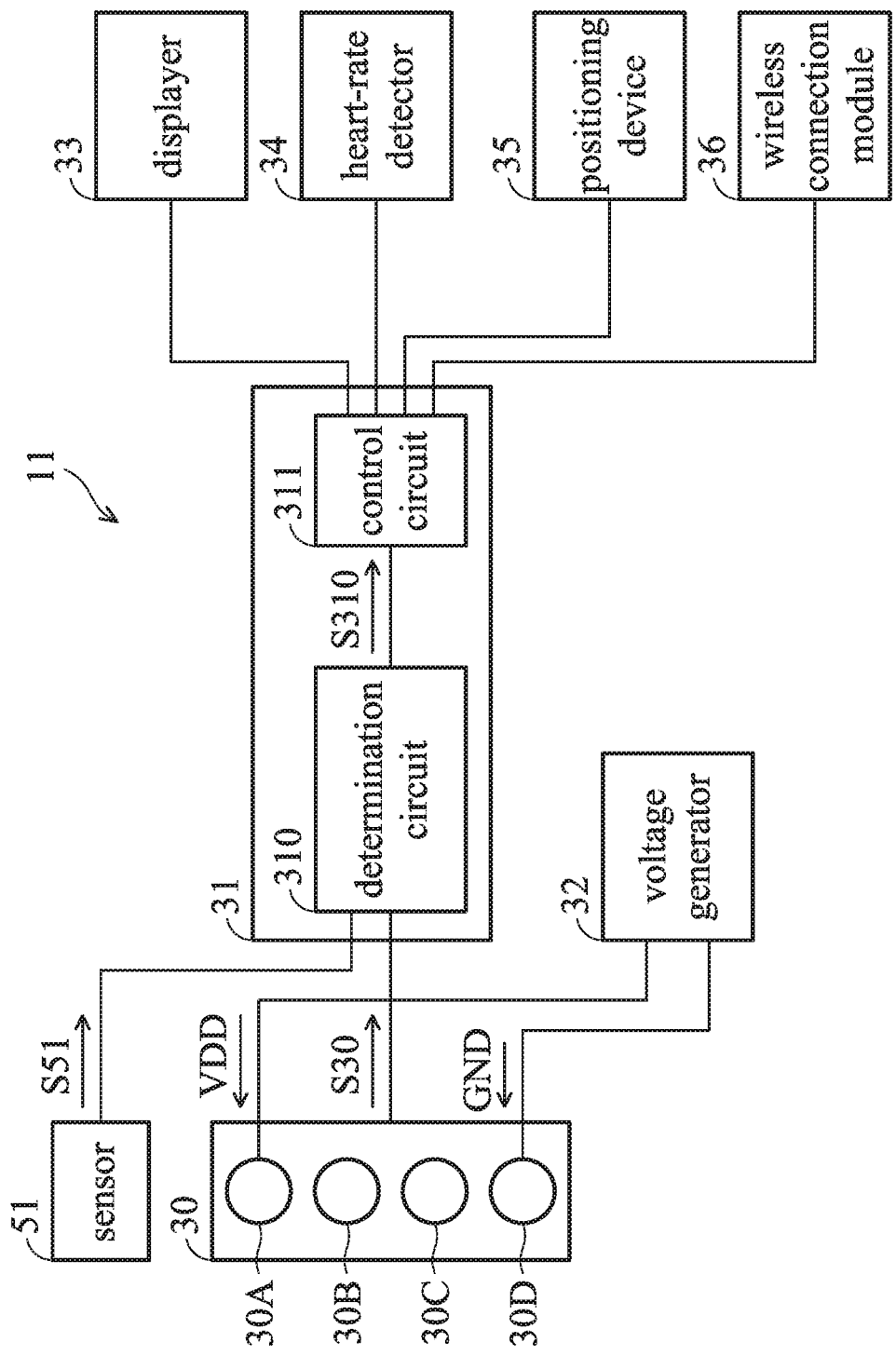
FIG. 5B shows another exemplary embodiment of a host of a wearable device.

In FIGS. 2A-2D, there four connection points (including two supply-voltage connection points 21A and 21D and two detection points 21B and 21C). Four connection structures are shown depending on the connections between the two supply-voltage connection points 21A and 21D and the two detection points 21B and 21C. That is, there are four kinds of serial-number combinations for the connector 21. In other embodiments, the connection portion 20 further comprises a magnetic-reed switch 50, as shown in FIG. 5A. The magnetic-reed switch 50 has two states: a turned-on state and a turned-off state. Accordingly, when a magnetic-reed switch is added into the embodiments of FIGS. 2A-2D, there are eight kinds of serial-number combinations for the connector 21. For a brief description, only the embodiment in which the connection portion 20 with the connection structure of FIG. 2A (both of the detection points 21B and 21C are connected with the supply-voltage connection point 21A) further comprises the magnetic-reed switch 50 is shown in FIG. 5A. The description related to the embodiments in which the connection portion 20 with the connection structures of FIGS. 2B-2D further comprises the magnetic-reed switch 50 is omitted here. FIG. 5B shows an exemplary embodiment of a host corresponding to the wearable device of FIG. 5A. Referring to FIG. 5B, the host 11 further comprises a sensor 51. When the host 11 is connected with the wearable device 10, the sensor 30 of the host 11 contacts the connector 21 of the wearable device 10, and the host 11 performs the detection operation which is described in the above embodiment of FIG. 2A. Moreover, during the detection operation, the host 11 further detects the state of the magnetic-reed switch 50 through the sensor 51. The sensor 51 generates a detection signal S51 to the determination circuit 310 according to the detection result. The determination circuit 310 identifies the serial number of the wearable device 10 according to the received detection signals S30 and S51 and generates the control signal S310 to the control circuit 311 according to the serial number. The control circuit 311 performs at least one functional operation according to the control signal S310.

Figure 6B:
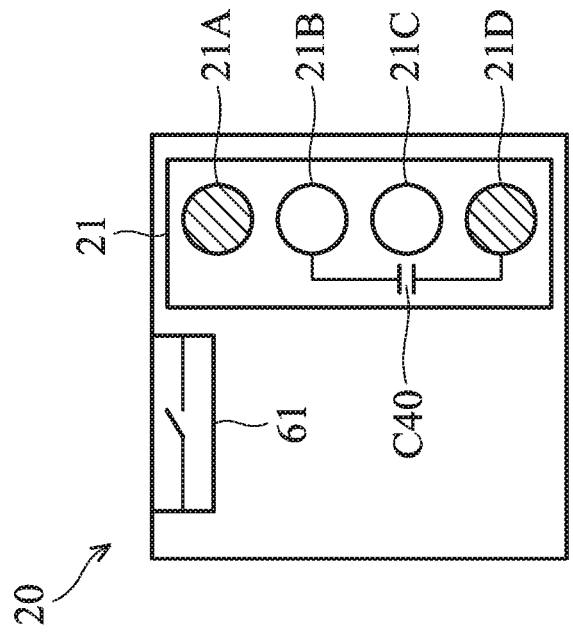
FIG. 6B shows another exemplary embodiment of a wearable device with a magnetic-reed switch.
Figure 6A:
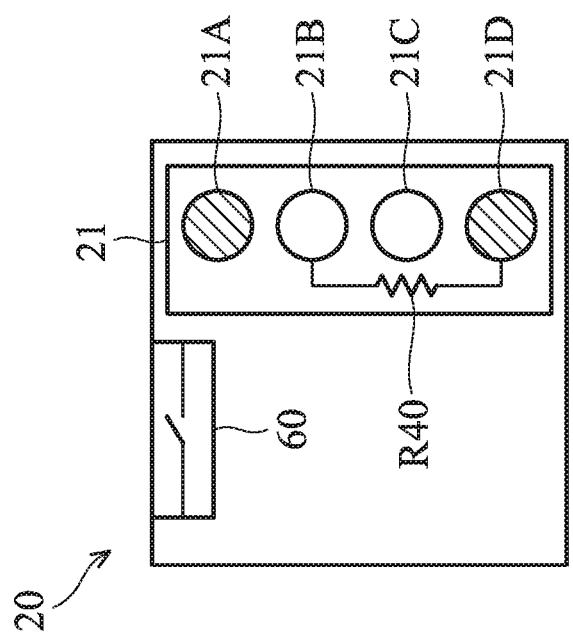
FIG. 6A shows another exemplary embodiment of a wearable device with a magnetic-reed switch.

Similarly, the connection portion 20 of the wearable device 10 of FIG. 4A comprises not only the connector 21 but also a magnetic-reed switch 60, as shown in FIG. 6A; the connection portion 20 of the wearable device 10 of FIG. 4B comprises not only the connector 21 but also a magnetic-reed switch 61, as shown in FIG. 6B. When the host 11 is connected with the wearable device 10, the sensor 30 of the host 11 contacts the connector 21 of the wearable device 10, and the host 11 performs the detection operation which is described in the above embodiment of FIGS. 4A and 4B. Moreover, referring to FIG. 5, during the detection operation, the host 11 further detects the state of the magnetic-reed switch 60/61 through the sensor 51. The sensor 51 generates the detection signal S51 to the determination circuit 310 according to the detection result. The determination circuit 310 identifies the serial number of the wearable device 10 according to the received detection signals S30 and S51 and generates the control signal S310 to the control circuit 311 according to the serial number. The control circuit 311 performs at least one functional operation according to the control signal S310.

Figure 7A:
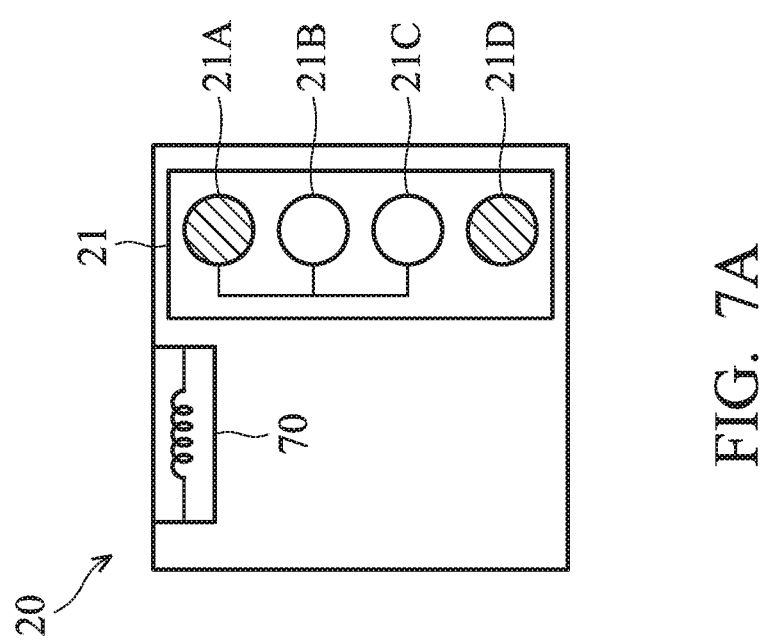
FIG. 7A shows an exemplary embodiment of a wearable device with a Hall transducer.
Figure 7B:
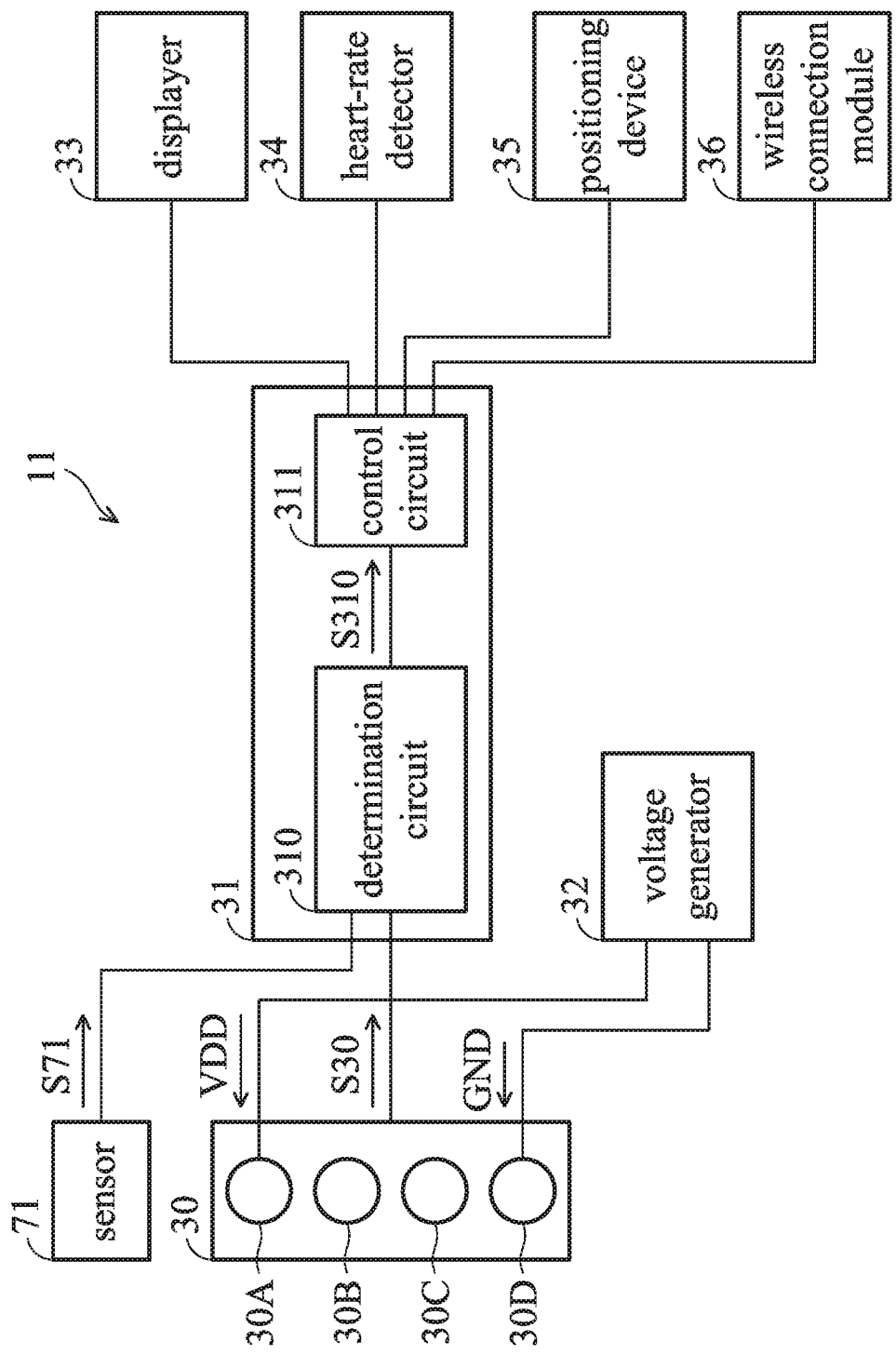
FIG. 7B shows another exemplary embodiment of a host of a wearable device.

In other embodiments, the connection portion 20 of the wearable device 10 of FIGS. 2A-2D comprises not only the connector 21 but also a Hall transducer 70, as shown FIG. 7A. For a brief description, only the embodiment in which the connection portion 20 with the connection structure of FIG. 2A (both of the detection points 21B and 21C are connected with the supply-voltage connection point 21A) further comprises the Hall transducer 70 is shown in FIG. 7A. The description related to the embodiments in which the connection portion 20 with the connection structures of FIGS. 2B-2D further comprises the Hall transducer 70 is omitted here. Since the Hall transducer 70 is configured in the connector 21, the host 11 further comprises a sensor 71, as shown in FIG. 7B. When the host 11 is connected with the wearable device 10, the sensor 30 of the host 11 contacts the connector 21 of the wearable device 10, and the host 11 performs the detection operation which is described in the above embodiment of FIG. 2A. Moreover, during the detection operation, the host 11 provides a detection current to the Hall transducer 70. According to the detection current and the magnetic field of the Hall transducer 70, the Hall transducer 70 generates an output voltage. The sensor 71 detects the output voltage and generates a corresponding detection signal S71 to the determination circuit 310. The determination circuit 310 identifies the serial number of the wearable device 10 according to the received detection signals S30 and S71 and generates the control signal S310 to the control circuit 311 according to the serial number. The control circuit 311 performs at least one functional operation according to the control signal S310.

Figure 8B:
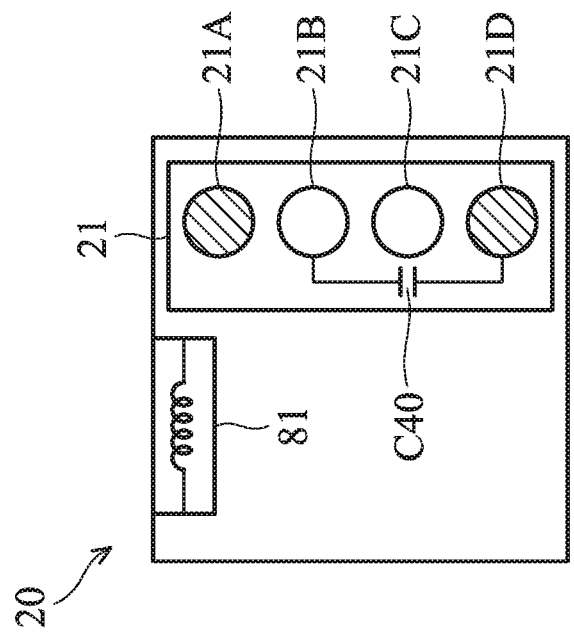
FIG. 8B shows another exemplary embodiment of a wearable device with a Hall transducer.
Figure 8A:
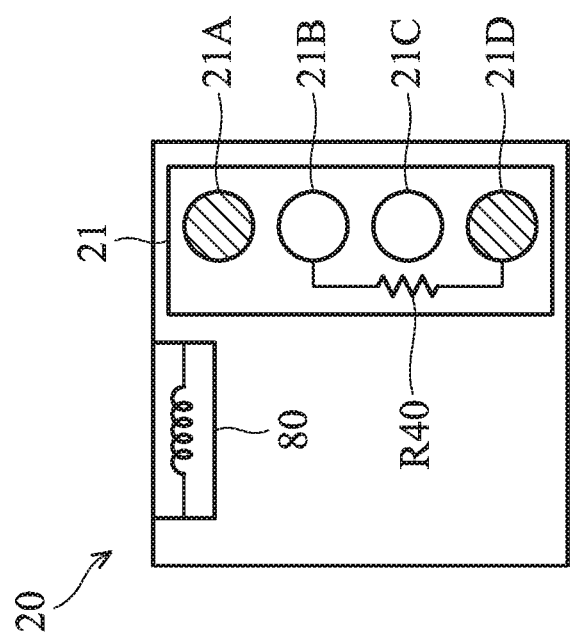
FIG. 8A shows another exemplary embodiment of a wearable device with a Hall transducer.

Similarly, the connection portion 20 of the wearable device 10 of FIG. 4A comprises not only the connector 21 but also a Hall transducer 80, as shown in FIG. 8A; the connection portion 20 of the wearable device 10 of FIG. 4B comprises not only the connector 21 but also a Hall transducer 81, as shown in FIG. 8B. When the host 11 is connected with the wearable device 10, the sensor 30 of the host 11 contacts the connector 21 of the wearable device 10, and the host 11 performs the detection operation which is described in the above embodiment of FIGS. 4A and 4B. Moreover, during the detection operation, the host 11 provides a detection current circuit to the Hall transducer 80/81.

According to the detection current and the magnetic field of the Hall transducer 80/81, the Hall transducer 80/81 generates an output voltage. The sensor 71 detects the output voltage and generates the detection signal S71 to the determination circuit 310 according to the detection result. The determination circuit 310 identifies the serial number of the wearable device 10 according to the received detection signals S30 and S71 and generates a control signal S310 to the control circuit 311 according to the serial number. The control circuit 311 performs at least one functional operation according to the control signal S310.

In the embodiments of FIGS. 7A-8, the detection currents may be provided by the sensor 71 or the voltage generator 312.

Figure 9B:
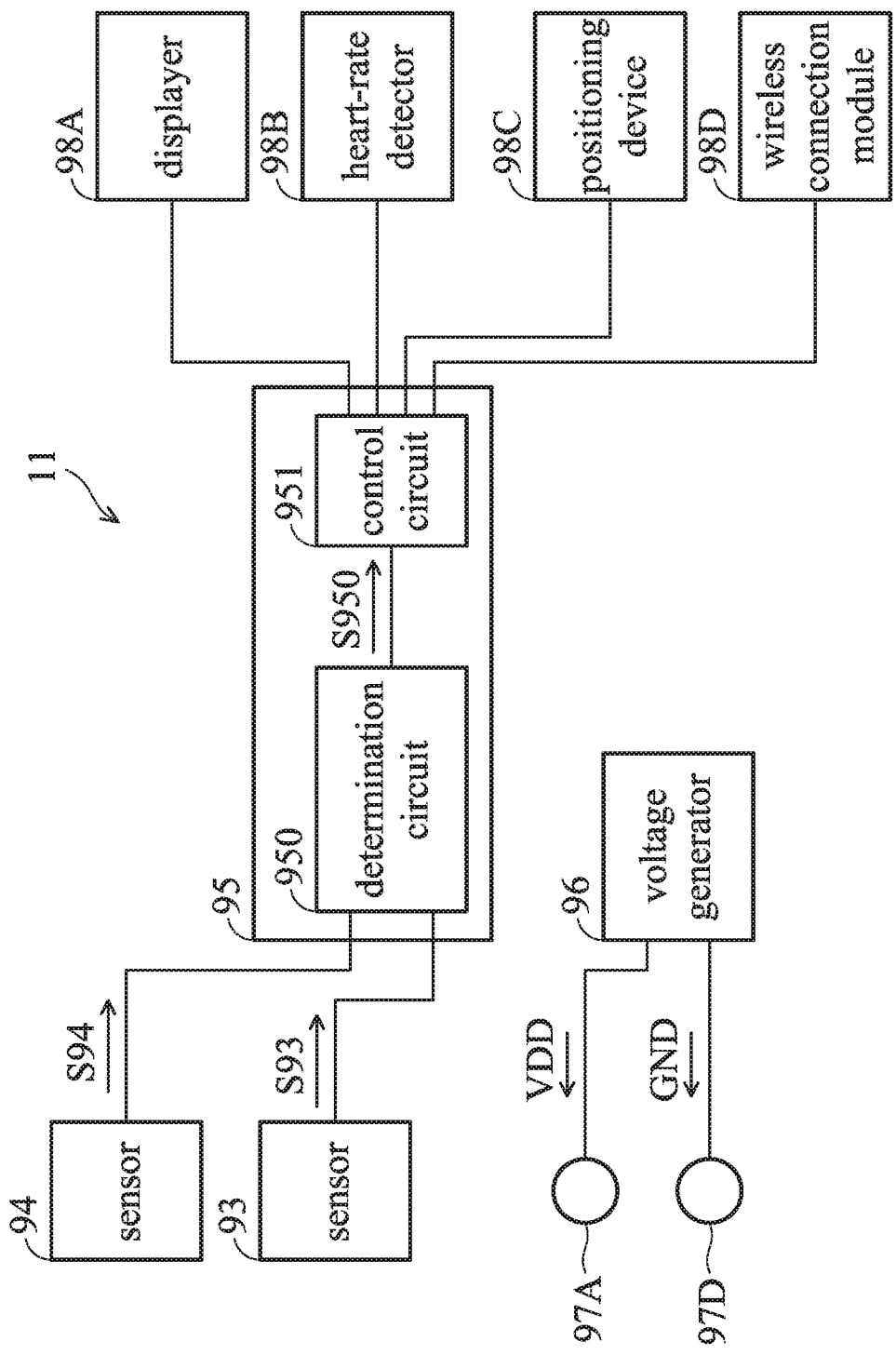
FIG. 9B shows an exemplary embodiment of a host of a wearable device.

FIG. 9A shows another exemplary embodiment of the wearable device 10. Referring to FIG. 9A, the connector 21 of the wearable device 10 comprises a connector 91 and a Hall transducer 92. In the embodiment, the connector 91 comprises a plurality of connection points, including supply-voltage connection points 91A and 91D and a plurality of detection points. In the embodiment of FIG. 9, two detection points 91B and 91C are given as an example, and these detection points are implemented by magnetic-reed switches. When the host 11 is placed on the wearable device 10, a sensor 93 (shown in FIG. 9B) of the host 11 contacts the connector 91 of the wearable device 10.

Referring to FIG. 9B, the host 11 comprises sensors 93 and 94, a processor 95, and a voltage-generator 96. The processor 95 comprises a determination circuit 950 and a control circuit 951. When the host 11 is connected with the wearable device 10, connection points 97A and 97D contact the supply-voltage connection points 91A and 91D of the connector 91. At this time, the voltage generator 96 provides an operation voltage VDD to the supply-voltage connector 91A through the connection point 97A and further provides a reference voltage GND to the supply-voltage connector 91D through the connection point 97D. In the embodiment, the voltage level of the operation voltage VDD is higher than the voltage level of the reference voltage GND. Moreover, when the host 11 is connected with the wearable device 10, the host 11 performs a detection operation.

When the host 11 performs the detection operation, the sensor 93 detects the turned-on/turned-off state of each of the magnetic-reed switches 91B and 91C and generates a corresponding detection signal S93 to the determination circuit 950 of the processor 95. Moreover, during the detection operation, the host 11 provides a detection current to the Hall transducer 92. According to the detection current and the magnetic field of the Hall transducer 92, the Hall transducer 92 generates an output voltage. The sensor 94 detects the output voltage and generates a corresponding detection signal S94 to the determination circuit 950. The determination circuit 950 identifies the serial number of the wearable device 10 according to the received detection signals S93 and S94 and generates the control signal S950 to the control circuit 951 according to the serial number. The control circuit 951 performs at least one functional operation according to the control signal S950. Referring to FIG. 9B, the host 11 further comprises a displayer 98A for displaying images. For example, the control circuit 951 performs at least one functional operation related to image display or human-machine interaction.

In an embodiment, the host 11 may further comprise various types of application devices, such as a heart-rate detector 98B and a positioning device 98C. When the determination circuit 950 identifies the serial number of the wearable device 10, the control circuit 951 controls at least one application device according to the received control signal S950. For example, according to the received control signal S950, the control circuit 951 controls the heart-rate detector 98B to perform a functional operation related to bio-signal measurement or controls the positioning device 98C to perform a functional operation related to positioning. In another embodiment, the host 11 may further comprise a wireless connection module 98D, such as a Bluetooth module or a near field communication (NFC) module. When the determination circuit 950 identifies the serial number of the wearable device 10, the control circuit 951 activates the wireless connection module 98D according to the received control signal S950 to communicate with an external device in a wireless manner. Using wireless communication, the host 11 is capable of performing signal transmission with the external device. For example, the host 11 uploads data to the external device, or the external device installs an application program into the host 11.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic system comprising:
   a wearable device comprising a connector and a magnetic-reed switch, wherein the connector comprises a first detection point; and
   a host detecting a voltage at the first detection point and a state of the magnetic-reed switch when the host performs a detection operation and performing at least one of a plurality of functional operations according to a detection result of the detection operation,
   wherein the host comprises:
   a first sensor detecting the voltage at the first detection point when the host performs the detection operation to generate a first detection signal;
   a second sensor detecting the state of the magnetic-reed switch when the host performs the detection operation to generate a second detection signal; and
   a processor receiving the first detection signal and a second detection signal and identifying a serial number of the wearable device according to the first detection signal and a second detection signal,
   wherein the processor performs at least one of the plurality of functional operations according to the identified serial number.

2. The portable electronic system as claimed in claim 1, wherein the wearable device further comprises:
   a first supply-voltage connection point; and
   a second supply-voltage connection point,
   wherein the first detection point is connected with the first supply-voltage connection point or the second supply-voltage connection point, and
   wherein during the detection operation being performed by the host, the host provides an operation voltage to the first supply-voltage connection point and further provides a reference voltage to the second supply-voltage connection point.

3. The portable electronic system as claimed in claim 2, wherein the connector further comprises:

a second detection point connected with the first supply-voltage connection point or the second supply-voltage connection point,
    wherein when the host performs the detection operation, the host further detects a voltage at the second detection point.

4. The portable electronic system as claimed in claim 1, wherein the wearable device further comprises:
    a voltage connection point; and
    a resistor coupled between the first detection point and the voltage connection point,
    wherein during the detection operation being performed by the host, the host provides a detection current to the first detection point and further provides a reference voltage to the voltage connection point.

5. The portable electronic system as claimed in claim 1, wherein the wearable device further comprises:
    a voltage connection point; and
    a capacitor coupled between the first detection point and the voltage connection point,
    wherein during the detection operation being performed by the host, the host provides a detection current to the first detection point and further provides a reference voltage to the voltage connection point.

6. The portable electronic system as claimed in claim 1, wherein the plurality of functional operations comprises image display, human-machine interaction, bio-signal measurement, and positioning.

7. The portable electronic system as claimed in claim 1, wherein when the host performs at least one of the plurality of functional operations, the host activates a wireless connection module to communication an external device.

8. The portable electronic system as claimed in claim 1, wherein the connector is implemented by a pogo-pin connector.

* * * * *